United States Patent
Song

(10) Patent No.: US 7,142,252 B2
(45) Date of Patent: Nov. 28, 2006

(54) IMAGE PROCESSING APPARATUS AND METHOD FOR DISPLAYING PICTURE-IN-PICTURE WITH FRAME RATE CONVERSION

(75) Inventor: Suk-beom Song, Suwon (KR)

(73) Assignee: Samsung Electronics Co., Ltd. (KR)

( * ) Notice: Subject to any disclaimer, the term of this patent is extended or adjusted under 35 U.S.C. 154(b) by 956 days.

(21) Appl. No.: 10/044,123

(22) Filed: Jan. 10, 2002

(65) Prior Publication Data

US 2002/0154658 A1 Oct. 24, 2002

(30) Foreign Application Priority Data

Mar. 10, 2001 (KR) ................. 2001-12446

(51) Int. Cl.
H04N 5/46 (2006.01)
H04N 5/45 (2006.01)

(52) U.S. Cl. ............... 348/565; 348/555; 348/564; 348/567

(58) Field of Classification Search ............ 348/555, 348/554, 556, 565, 512, 564, 567, 714–716, 348/441, 445, 446; H04N 5/46, 5/45
See application file for complete search history.

(56) References Cited

U.S. PATENT DOCUMENTS

| | | | |
|---|---|---|---|
| 4,914,509 A | 4/1990 | Idei | 358/22 |
| 5,504,536 A * | 4/1996 | Yatomi et al. | 348/565 |
| 5,598,525 A | 1/1997 | Nally et al. | 395/520 |
| 5,635,984 A * | 6/1997 | Lee | 348/333.05 |
| 5,808,630 A | 9/1998 | Pannell | 345/514 |
| 5,914,757 A | 6/1999 | Dean et al. | 348/584 |
| 6,094,230 A * | 7/2000 | Han | 348/564 |
| 6,175,387 B1 * | 1/2001 | Han | 348/565 |
| 6,351,291 B1 * | 2/2002 | Asano | 348/564 |
| 6,384,868 B1 * | 5/2002 | Oguma | 348/564 |
| 6,552,750 B1 * | 4/2003 | Suen et al. | 348/561 |

FOREIGN PATENT DOCUMENTS

| | | |
|---|---|---|
| EP | 0601647 A1 | 6/1994 |
| EP | 0675478 A1 | 10/1995 |
| EP | 0833506 A1 | 4/1998 |
| GB | 2291320 | 1/1996 |

* cited by examiner

Primary Examiner—Trang U. Tran
(74) Attorney, Agent, or Firm—Mills & Onello LLP

(57) ABSTRACT

An apparatus and method for implementing picture-in-picture with frame rate conversion includes an input buffer unit, a data synchronizing unit, first through third memories, and a memory control unit. The input buffer unit buffers input data and outputs buffered data as first data and first data enabling signals. The data synchronizing unit synchronizes the first data output with an output clock signal and outputs synchronized data as second data and second data enabling signals. The first memory multiplexes the second data and outputs stored data in response to a first memory enabling signal. The second memory writes and reads data output from the first memory in response to a frame buffer control signal. The third memory outputs stored data as a display signal. The memory control unit controls data flow between the memories and frame rates of the input data.

20 Claims, 9 Drawing Sheets

IMAGE PROCESSING APPARATUS AND METHOD FOR DISPLAYING PICTURE-IN-PICTURE WITH FRAME RATE CONVERSION

BACKGROUND OF THE INVENTION

1. Field of the Invention

The present invention relates to an image processing system, and more particularly, to an image processing apparatus and a method for implementing picture-in-picture (PIP) with frame rate conversion.

2. Description of the Related Art

In a conventional television (TV), one channel is displayed on a display device. However, a plurality of channels can be displayed on the display device of a TV using a feature called picture-in-picture (PIP). PIP is an image processing method for simultaneously displaying another channel on part of the display device. In prior systems, in order to display PIP, two frame memories for storing asynchronously input image data have been used. Since the size of an image processing apparatus for displaying the PIP is increased by frame memories, such systems can be too large.

In a case where frame rates of input signals are different from that of the display device, a frame rate conversion device is used to adjust the frame rates of the input signals. A conventional frame rate conversion device prevents data from being compromised by synchronizing a clock used as a frame buffer clock with the frequency of each of the input signals using a phase locked loop (PLL). However, in case of using a PLL, the size of a circuit is increased, and a method for operating a frame buffer becomes complicated. Thus, this method is not effective.

Also, for the above-mentioned PIP and frame rate conversion, there are the following problems. For example, assuming that there are two input signals which are asynchronous data, when two input signals are displayed on one display device, the two input signals must be synchronized with each other. Further, in a case where there are limitations in that the display device can not perform a multi-sync function for generating various synchronized signals owing to physical and technical characteristics, a function for simultaneously converting the two input signals to an output frame rate of the display device must be provided. For example, in the case of a liquid crystal device (LCD) monitor, the output frame rate of a display signal in a SXGA level (1280×1024) monitor is physically restricted to 75 KHz or less. Also, the output frame rate in a UXGA level (1600×1200) monitor is restricted to 60 Hz or less. That is, in a case where input signals above the output frame rate are displayed on the display device, the frame rates of the input signals must be reduced. Also, in a case where the frame rates of the two input signals are different, and there is one display device, the frame rates of the two input signals must be independently converted to the output frame rate of the display device. However, in a case where PIP and frame rate conversion are simultaneously performed, a process of synchronizing the two input signals is complicated. During the process, data may be damaged, and the size of a system may be increased by an increase in frame memories.

SUMMARY OF THE INVENTION

To solve the above problems, it is a first objective of the present invention to provide an image processing apparatus capable of displaying picture-in-picture (PIP) using one frame buffer to effectively operate memory and capable of performing frame rate conversion without damaging data, even in a case where an input signal is not synchronized with an output signal, by using a simple data synchronizing circuit.

It is a second objective to provide an image processing method for displaying PIP with frame rate conversion implemented by the image processing apparatus.

In accordance with the invention, there is provided an image processing apparatus for displaying on a display device a plurality of input data asynchronously input through different channels and converting frame rates of each of the input data in accordance with an output frame rate of the display device. The image processing apparatus includes an input buffer unit, a data synchronizing unit, first, second, and third memories, and a memory control unit. The input buffer unit buffers input data, which are externally and asynchronously input through two or more channels, using different input clock signals and outputs buffered data as first data and first data enabling signals. The data synchronizing unit synchronizes the first data output from the input buffer unit with an output clock signal in response to one of the different input clock signals and the first data enabling signals and outputs synchronized data as second data and second data enabling signals in response to each of the first data enabling signals. The first memory multiplexes the second data according to time sharing, stores the second data in different regions, and outputs stored data in response to a first memory enabling signal. The second memory writes and reads data output from the first memory in response to a frame buffer control signal. The third memory stores data output from the second memory and outputs the stored data as a display signal in response to a second memory enabling signal. The memory control unit generates the first memory enabling signal to control data flow between the first memory and the second memory, generates the frame buffer control signal to control frame rates of the first and second data and the display signal, and generates the second memory enabling signal to control data flow between the second memory and the third memory.

In accordance with the invention, there is also provided an image processing method for displaying on one display device a plurality of input data asynchronously input through different channels and converting frame rates of the input data in accordance with an output frame rate of the display device. The method comprises the steps of (a) buffering the plurality of input data using each of input clock signals and synchronizing each of buffered data with an output clock signal, (b) storing the plurality of input data synchronized with the output clock signal in a first memory in response to input enabling signals, (c) comparing a write address with a read address of the first memory to determine whether data stored in the first memory are stored in a second memory, (d) comparing the frame rates of the plurality of input data with that of an output display signal to control data write and read of the second memory, and (e) comparing a write address with a read address of a third memory to determine whether output data of the second memory are also stored in the second memory, and outputting data stored in the third memory as a display signal for displaying on the display device.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
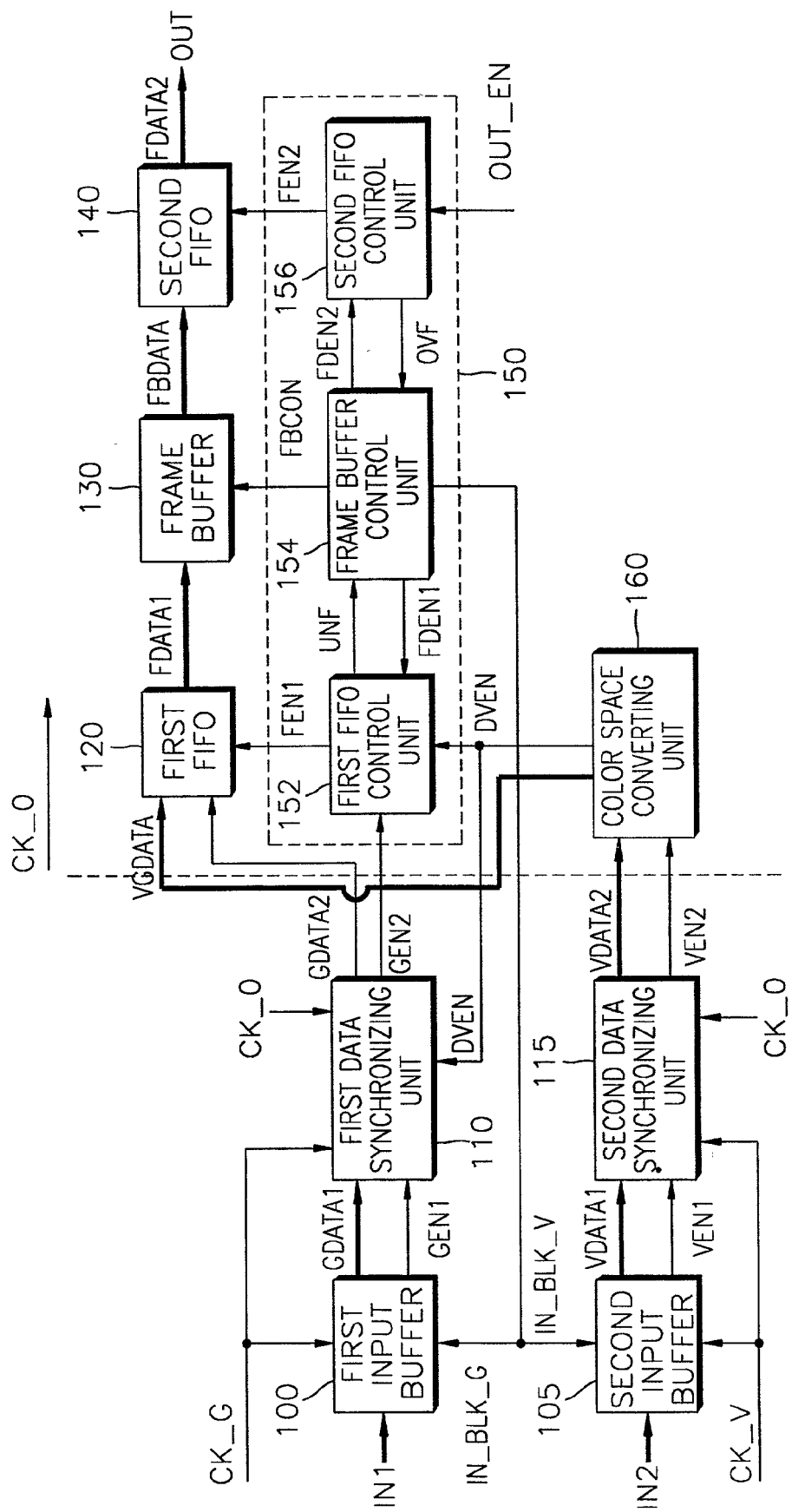
FIG. 1 is a block diagram of an image processing apparatus for implementing picture-in-picture (PIP) with frame rate conversion according to an embodiment of the present invention.

FIG. 1 is a block diagram of an image processing apparatus for implementing picture-in-picture (PIP) with frame rate conversion according to an embodiment of the present invention. Referring FIG. 1, the image processing apparatus includes a first input buffer 100, a second input buffer 105, a first data synchronizing unit 110, a second synchronizing unit 115, a first first-in first-out (FIFO) 120, a frame buffer 130, a second FIFO 140, a memory control unit 150, and a color space converting unit 160.

The first input buffer 100 buffers a first input data IN1 input through a first channel in response to a first clock signal and outputs buffered data as a first data and a first data enabling signal. Here, assuming that the first input data IN1 is graphic data that is externally input, for example, R, G, and B signals, then the first clock signal is a graphic clock signal CK_G for buffering the graphic data, and the first data and the first data enabling signal, which are output from the first input buffer 100, are a first graphic data GDATA1 and a first graphic enabling signal GEN1, respectively. Also, the first graphic data GDATA1 output from the first input buffer 100 is blocked in response to a first input blocking signal, that is, a graphic input blocking signal IN_BLK_G, output from the memory control unit 150 and is intercepted so that it is not input into the first data synchronizing unit 110 in a blocked state.

The second input buffer 105 buffers a second input data IN2 input through a second channel in response to a second clock signal and outputs buffered data as a second data and a second data enabling signal. Here, assuming that the second input data IN2 is video data that is externally input, for example, a luminance signal (Y) and a color-difference signal (U/V), then the second clock signal is a video clock signal CK_V for buffering the video data, and the second data and the second data enabling signal, which are output from the second input buffer 105, are a first video data VDATA1 and a first video enabling signal VEN1, respectively. Also, the first video data VDATA1 output from the second input buffer 105 is blocked in response to a second input blocking signal, that is, a video input blocking signal IN_BLK_V, output from the memory control unit 150 and is intercepted so that it is not input into the second data synchronizing unit 110 in a blocked state.

In the embodiment of FIG. 1, a case of using two input buffers is illustrated. However, more than two input buffers may be used depending on the design of the image processing apparatus. Also, the first and second input buffers 100 and 105 may be merged into one input buffer unit and named accordingly.

The first graphic data GDATA1 is input into the first data synchronizing unit 110 in response to the graphic clock signal CK_G and the first graphic enabling signal GEN1. The first data synchronizing unit 110 synchronizes the first graphic data GDATA1 with an output clock signal CK_O. Also, the first data synchronizing unit 110 outputs the first graphic data GDATA1 synchronized with the output clock signal CK_O as a second graphic data GDATA2 and a second graphic enabling signal GEN2 in response to a delayed video enabling signal DVEN.

The first video data VDATA1 is input into the second data synchronizing unit 115 in response to the first video enabling signal VEN1 and the video clock signal CK_V, which are output from the second input buffer 105. The second data synchronizing unit 115 synchronizes the first video data VDATA1 with the output clock signal CK_O. Also, the second data synchronizing unit 115 outputs the first video data VDATA1 synchronized with the output clock signal CK_O as a second video data VDATA2 and a second video enabling signal VEN2. Here, the second video data VDATA2 and the second video enabling signal VEN2 are output to the color space converting unit 160. The first and second data synchronizing units 110 and 115 may be merged into one data synchronizing unit and named accordingly.

The color space converting unit 160 converts the second video data VDATA2 output from the second data synchronizing unit 115 into a graphic data of R/G/B and outputs converted video data VGDATA. Also, the color space converting unit 160 delays the second video enabling signal VEN2 for a predetermined time and outputs the delayed video enabling signal DVEN to the memory control unit 150 and the first data synchronizing unit 110. The color space converting unit 160 is selectively used and may be not used depending on the design of a system. The converted video data VGDATA, which is the second video data VDATA2 converted into a graphic data in the color space converting unit 160, is applied to the first FIFO 120.

The memory control unit 150 generates a first FIFO enabling signal FEN1 to control data flow between the first FIFO 120 and the frame buffer 130 and generates a frame buffer control signal FBCON to control frame rates of data input into the frame buffer 130 and an output display signal. Also, the memory control unit 150 generates a second FIFO enabling signal FEN2 to control data flow between the frame buffer 130 and the second FIFO 140. For these operations, the memory control unit 150 includes a first FIFO control unit 152, a frame buffer control unit 154, and a second FIFO control unit 156.

Specifically, the first FIFO control unit 152 generates the first FIFO enabling signal FEN1 in response to the second graphic enabling signal GEN2 output from the first data synchronizing unit 110, in response to a delayed first video enabling signal DVEN, and in response to a first frame data enabling signal FDEN1. Also, the first FIFO control unit 152 generates a write address and a read address of the first FIFO 120, detects underflow (UNF) between the write address and the read address, and controls data write and read of the first FIFO 120 according to a detected result. Here, the write address and the read address are generated by circular addressing. In addition, the first FIFO control unit 152 outputs the underflow UNF to the frame buffer control unit 154 and receives the first frame data enabling signal FDEN1 corresponding to the underflow UNF from the frame buffer control unit 154 to generate the first FIFO enabling signal FEN1. Here, the first frame data enabling signal FDEN1 is a signal for indicating a write interval and a read interval of the frame buffer 130 and for indicating a write interval of a graphic data and a write interval of a video data.

The frame buffer control unit 154 compares a frame rate of the data input into the frame buffer 130 with that of an output display signal, generates the graphic and video input blocking signals IN_BLK_G and IN_BLK_V for blocking data of the first and second input buffers 100 and 105 in response to the compared result, and outputs the graphic and video input blocking signals IN_BLK_G and IN_BLK_V to the first and second buffers 100 and 105. Also, the frame buffer control unit 154 generates the first and second frame data enabling signals FDEN1 and FDEN2 and the frame buffer control signal FBCON by using the underflow UNF detected from the first FIFO control unit 152 and by using overflow (OVF) detected from the second FIFO control unit 156. Frame rate conversion implemented in the frame buffer control unit 154 will be described in detail with reference to FIGS. 5A and 5B. Also, the frame buffer control unit 154 enables the second frame data enabling signal FDEN2 when data is read from the frame buffer 130 to the second FIFO 140.

The second FIFO control unit 156 generates the second FIFO enabling signal FEN2 in response to the second frame data enabling signal FDEN2 and an output enabling signal OUT_EN. Also, the second FIFO control unit 156 generates a write address and a read address of the second FIFO 140, detects overflow OVF between the write address and read address of the second FIFO 140 to control data write and read of the second FIFO 140 according to a detected result. Here, the output enabling signal OUT_EN is a signal generated from a timing generating circuit (not shown), and data is output from the second FIFO 140 according to an output display format. For example, the output display format may be decided by considering information such as the number of horizontal lines and the number of vertical lines.

The first FIFO 120 includes different storing regions and exclusively stores the second graphic data GDATA2 output from the first data synchronizing unit 110 and the converted video data VGDATA output from the color space converting unit 160 in response to the first FIFO enabling signal FEN1 output from the first FIFO control unit 152 and the output clock signal CK_O, in each of the different storing regions. Here, data output from the first FIFO 120 is referred to as first FIFO output data FDATA1.

The frame buffer 130 stores the first FIFO output data FDATA1 in response to the frame buffer control signal FBCON output from the frame buffer control unit 154 and the output clock signal CK_O and outputs a stored data FBDATA. Here, data output from the frame buffer 130 is referred to as frame buffer output data FBDATA. The frame buffer 130 may be realized as memory for storing at least one frame of data of the input video data.

The frame buffer output data FBDATA input into the second FIFO 140, and the second FIFO 140 outputs data in response to the second FIFO enabling signal FEN2 output from the second FIFO control unit 156. Here, the data output from the second FIFO 140 is referred to as second FIFO output data FDATA2 and is output as a display signal through an output terminal OUT.

Referring to FIG. 1, signals left of the dotted line are asynchronous, and signals right of the dotted line are synchronized with the output clock signal CK_O.

Figure 2:
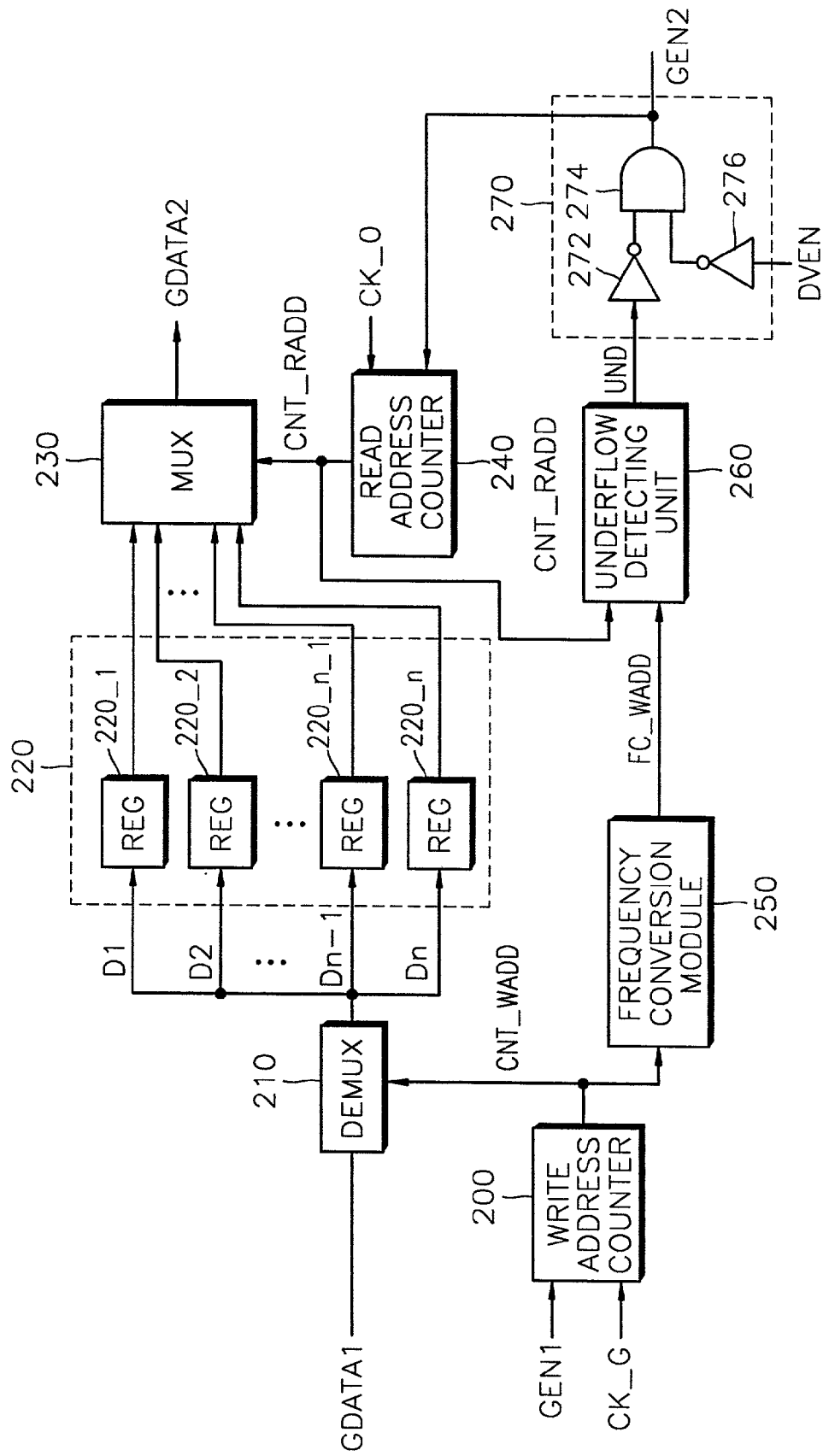
FIG. 2 is a block diagram of a first data synchronizing unit of the image processing apparatus shown in FIG. 1.

FIG. 2 is a block diagram of the first data synchronizing unit 110 of the image processing apparatus shown in FIG. 1. Referring to FIG. 2, the first data synchronizing unit 110 includes a write address counter 200, a demultiplexer 210, a parallel buffer 220, a multiplexer 230, a read address counter 240, a frequency conversion module 250, an underflow detecting unit 260, and a graphic enabling signal generating unit 270.

The write address counter 200 counts a write address of the parallel buffer 220 in response to a graphic clock signal CK_G and a first graphic enabling signal GEN1 and outputs a counted write address CNT_WADD. The demultiplexer 210 demultiplexes input data in response to the counted write address CNT_WADD output from the write address counter 200 and selectively outputs data demultiplexed by the demultiplexer 210 to one of a number (N) of parallel registers 220_1, ..., 220_n of the parallel buffer 220.

The parallel buffer 220 includes a number of (N) parallel registers 220_1, ..., 220_n and stores data D1, ..., Dn demuliplexed in the demultiplexer 210. As shown in FIG. 2, the first graphic data GDATA1 is stored in one of the parallel registers 220_1, ..., 220_n in response to the graphic clock signal CK_G.

The frequency conversion module 250 converts the frequency region of the counted write address CNT_WADD into the frequency of an output clock signal CK_O and outputs a converted frequency write address FC_WADD. Operation of the frequency conversion module 250 will be described in detail with reference to FIG. 3.

The read address counter 240 counts a read address of the parallel buffer 220 in response to the output clock signal CK_O and a second graphic enabling signal GEN2 and outputs a counted read address CNT_RADD.

The underflow detecting unit 260 receives the counted read address CNT_RADD output from the read address counter 240 and the converted frequency write address FC_WADD, thereby generating an underflow UND of the parallel buffer 220.

The graphic enabling signal generating unit 270 generates the second graphic enabling signal GEN2 in response to the underflow UND. Preferably, an AND operation is performed on the underflow UND and a delayed video enabling signal DVEN, thereby generating the second graphic enabling signal GEN2. For this operation, the graphic enabling signal generating unit 270 includes inverters 272 and 276, and an AND gate 274. The inverter 272 inverts the underflow UND detected in the underflow detecting unit 260 and outputs an inverted underflow signal. The inverter 276 inverts the delayed video enabling signal DVEN and outputs an inverted delayed video enabling signal. The AND gate 274 performs an AND operation on an output signal of the inverter 272 and an output signal of the inverter 276 and outputs the ANDed signal as the second graphic enabling signal GEN2.

The multiplexer 230 receives data output from one of the registers 220_1, ..., 220_n of the parallel buffer 220 and selectively outputs the data as a second graphic data GDATA2 in response to the counted read address CNT_RADD output from the read address counter 240.

Hereinafter, operation of the first data synchronizing unit 110 shown in FIG. 2 will be described in greater detail. First, when the first graphic enabling signal GEN1 is applied through the first input buffer 100, the write address counter 200 sequentially counts a write address of the parallel buffer 220 in response to the graphic clock signal CK_G. Here, data output from the demultiplexer 210 in response to the counted write address CNT_WADD are stored in one of the parallel registers 220_1, . . . , 200_n of the parallel buffer 220. Here, the frequency of the counted write address CNT_WADD is converted and is generated as FC_WADD, and the underflow UND is detected in response to the converted frequency write address CNT_WADD and the counted read address CNT_RADD. That is, in a case where there is no further data to be output from the parallel buffer 220 due to a slow increase in the write address while the read address is increasing, the underflow UND is set to a predetermined level, for example, to a high level. In this case, the second graphic enabling signal GEN2 generated from the graphic enabling signal generating unit 270 is at a low level. Thus, data output from the first data synchronizing unit 110 to the first FIFO 120 through the multiplexer 230 is regarded as invalid data. However, in a case where the underflow UND is not detected and is set as a low level and then the delayed second video enabling signal DVEN is at a low level, the second graphic enabling signal GEN2 is enabled at a high level. Thus, the read address counter 240 is enabled, and a graphic data output to the first FIFO 120 through the multiplexer 230 is regarded as valid data.

FIGS. 3A through 3J are timing diagrams illustrating operation of a frequency conversion module 250 of the first data synchronizing unit 110 shown in FIG. 2. FIG. 3A denotes an input clock signal, for example, a graphic clock signal CK_G, FIG. 3B denotes a parallel buffer write address WADD, FIG. 3C denotes an even write address WADD_E, and FIG. 3D denotes an odd write address WADD_O. Also, FIG. 3E denotes a selection signal SEL_I generated by the graphic clock signal CK_G, FIG. 3F denotes an output clock signal CK_O, FIG. 3G denotes a synchronized even write address WADD_EO synchronized with the output clock signal CK_O, FIG. 3H denotes a synchronized odd write address WADD_OO synchronized with the output clock signal CK_O, FIG. 3I denotes a synchronized selection signal SEL_IO synchronized with the output clock signal CK_O, and FIG. 3J denotes the converted frequency write address FC_WADD.

Operation of the frequency conversion module 250 of FIG. 2 will be described with reference to FIG. 3 as follows. The parallel buffer write address WADD is synchronized with the graphic clock signal CK_G shown in FIG. 2 and is divided into an even write address WADD_E shown in FIG. 3C and an odd write address WADD_O shown in FIG. 3D. When the output clock signal CK_O is input, as shown in FIG. 3F, the selection signal SEL_I shown in FIG. 3E is synchronized with the output clock signal CK_O, resulting in the synchronized selection signal SEL_IO of FIG. 3I. Here, the even write address WADD_E and the odd write address WADD_O are synchronized with the output clock signal CK_O, resulting in the synchronized even write address WADD_EO shown in FIG. 3G and the synchronized odd write address WADD_OO of FIG. 3H, respectively.

For example, as indicated by times V1 through V3, when a timing violation occurs, each of the even and odd synchronized write addresses WADD_EO and WADD_OO and the selection signal SEL_IO can be inaccurately marked as intervals a through c. Here, an assumption is made that the synchronized odd write address WADD_OO is output when the synchronized selection signal SEL_IO of FIG. 3I is at a low level, and the even write address WADD_EO is output when the selection signal SEL_IO is at a high level. That is, even though each of the intervals a and b is inaccurate due to the time V1 and the time V2, the synchronized selection signal SEL_IO is at a low level for the interval a, and the SEL_IO is at a high level for the interval b, thus the converted frequency write address FC_WADD cannot be normally output. Also, at the time V3, it does not matter whether an address D of FIG. 3J output at the interval c of the synchronized selection signal SEL_IO of FIG. 3I is an even number or an odd number. That is, the converted frequency write address FC_WADD may be address 3 or address 4.

Figure 4:
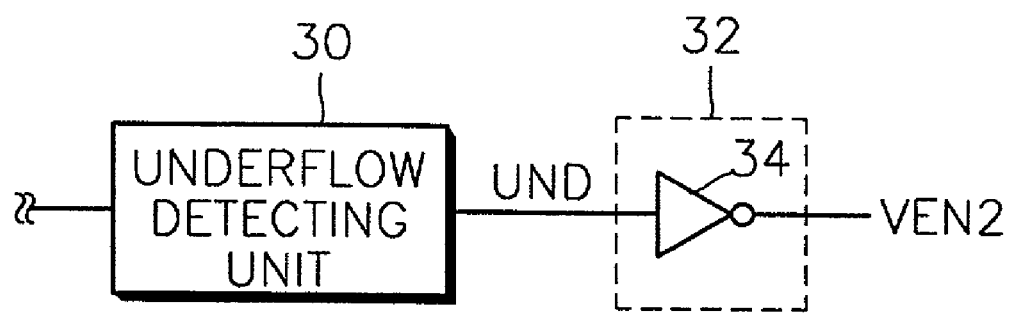
FIG. 4 is a block diagram of a second data synchronizing unit of the image processing apparatus shown in FIG. 1.

FIG. 4 is a block diagram of a portion of the second data synchronizing unit 115 of FIG. 1. The second data synchronizing unit 115 has a similar structure to that of the first data synchronizing unit 110, except for a difference in the structure of an output terminal. Thus, description and illustration of the same elements will be omitted, and only an underflow detecting unit 30 and a video enabling signal generating unit 32 are shown in FIG. 4.

Referring to FIG. 4, the video enabling signal generating unit 32 is comprised of an inverter 34 for inverting an underflow UND detected from the underflow detecting unit 30. That is, the inverter 34 inverts the underflow UND detected from the underflow detecting unit 30 of FIG. 4 and outputs the result as a second video enabling signal VEN2. Although not specifically shown, the second video enabling signal VEN2 is input into a read address counter (not shown), and simultaneously, the VEN2 is output as a delayed video enabling signal DVEN through the color space converting unit 160 of FIG. 1.

Figure 3:
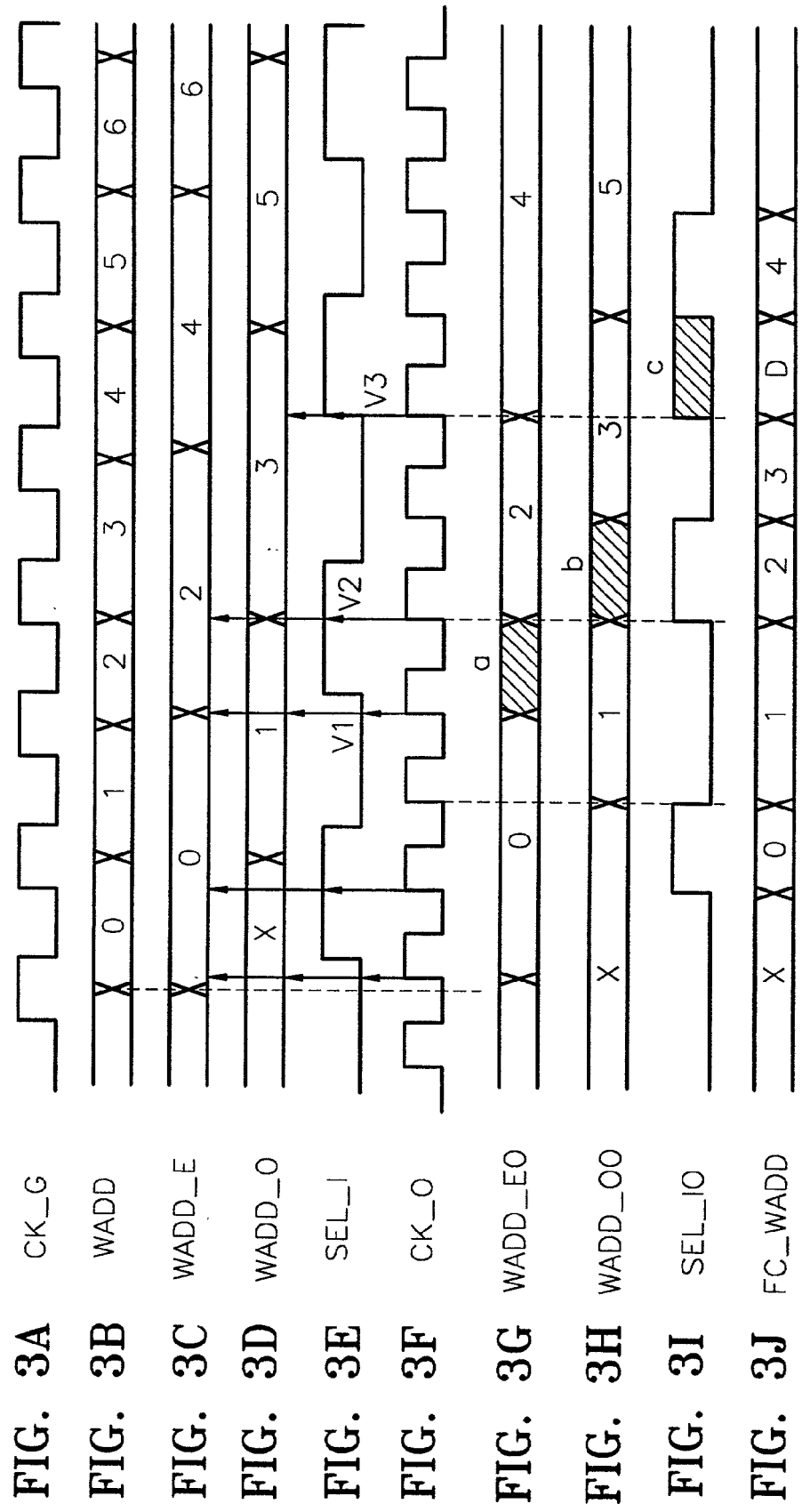
FIGS. 3A through 3J are timing diagrams illustrating operation of a frequency conversion module of the first data synchronizing unit shown in FIG. 2.

In this way, in a state where the second video enabling signal VEN2 is enabled in the first and second data synchronizing units 110 and 115 shown in FIGS. 2 through 4, a video data VDATA2 is input into the first FIFO 120. Here, the second graphic enabling signal GEN2 is disabled. Thus, the second graphic data GDATA2 is not input to the first FIFO 120 and denotes a state of being stored in the parallel buffer 220. On the other hand, when the second graphic enabling signal GEN2 is enabled, the graphic data stored in the parallel buffer 220 is input to the first FIFO 120. Here, since the second video enabling signal VEN2 is disabled, the video data is not input to the first FIFO 120, but instead stored in the parallel buffer 220.

Figure 5A:
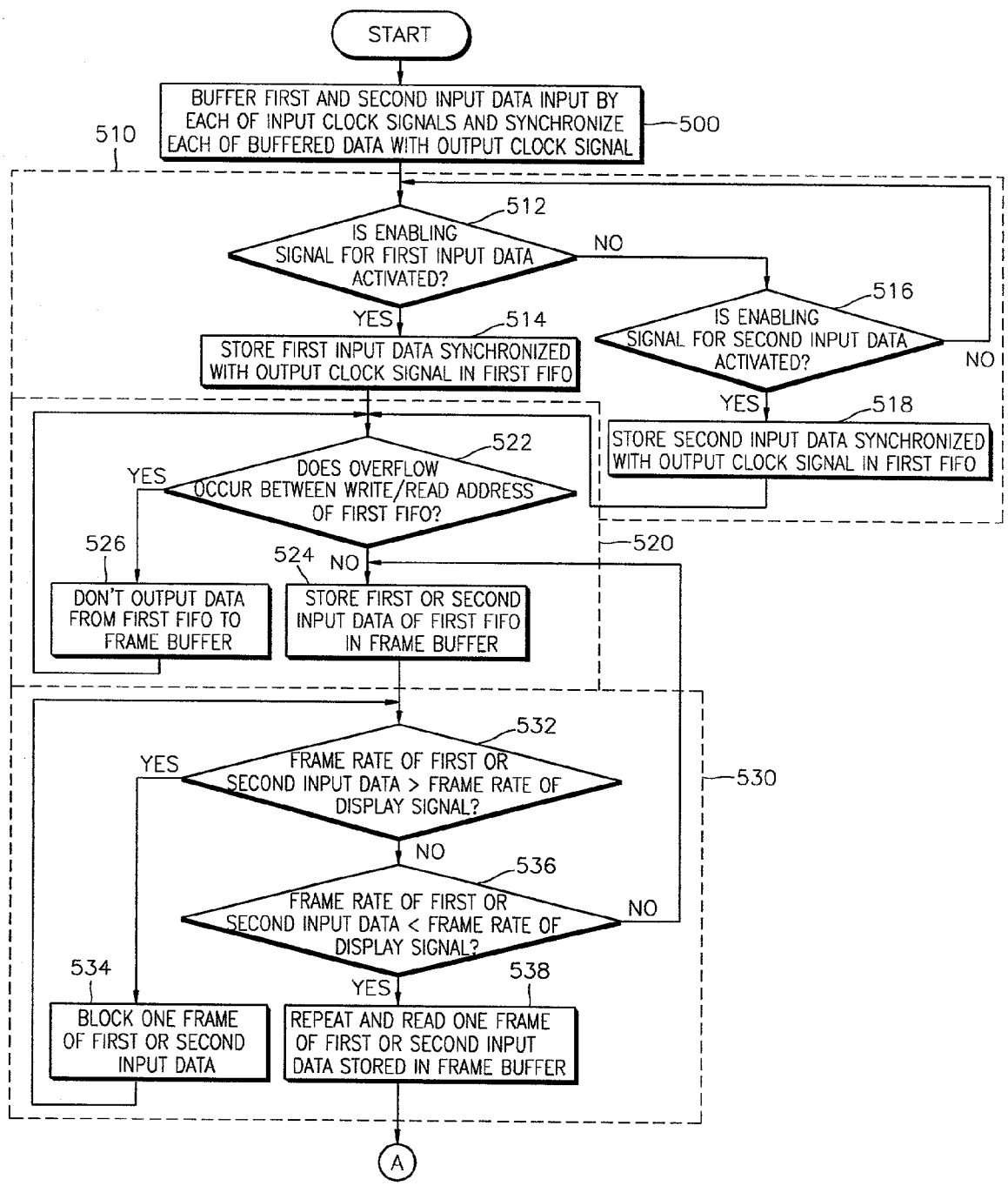
FIGS. 5A and 5B are flow charts illustrating an image processing method for implementing PIP with frame rate conversion according to the embodiment of the present invention.
Figure 5B:
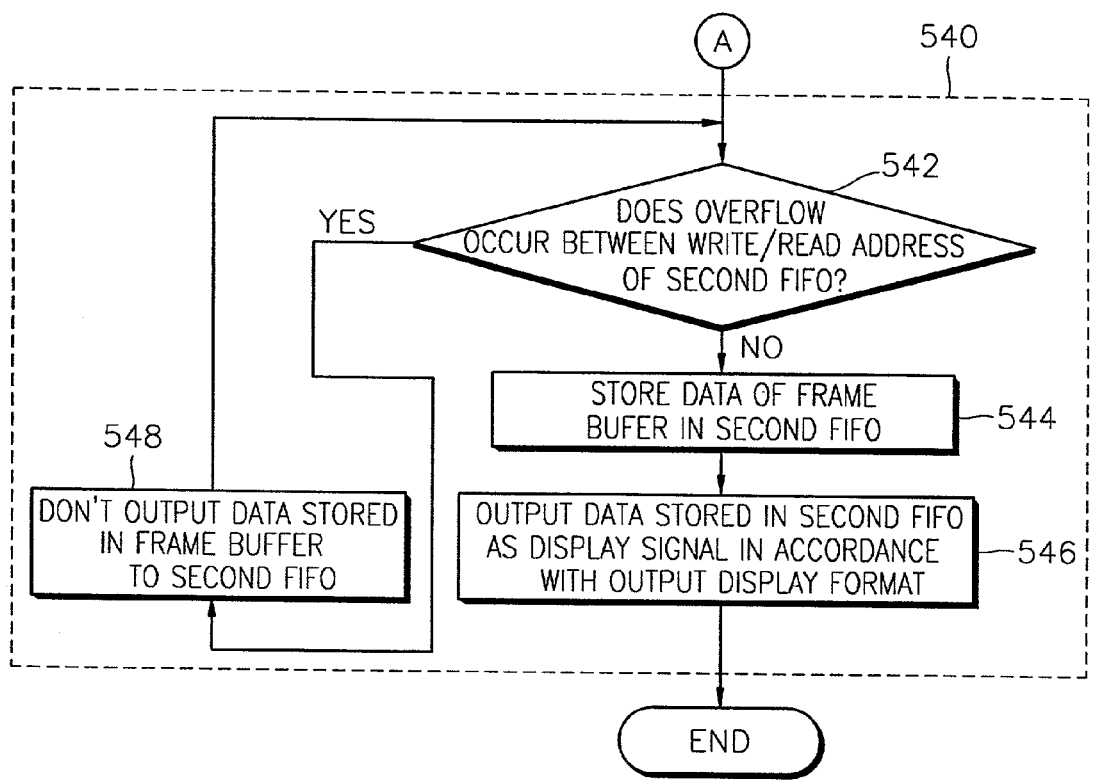

FIGS. 5A and 5B are flow charts illustrating an image processing method for implementing PIP with frame rate conversion according to an embodiment of the present invention. Operation of the image processing apparatus according to the present invention and method thereof will be described in detail with reference to FIGS. 1 through 5.

First, referring to FIG. 5A, first and second input data IN1 and IN2, which are input by each of the input clock signals, that is, the graphic clock signal CK_G and the video clock signal CK_V, through different channels for PIP, are buffered, and each of the buffered data is synchronized with the output clock signal CK_O in step 500. That is, step 500 is performed in the first and second input buffers 100 and 105 and the first and second data synchronizing units 110 and 115 of FIG. 1, and the first and second input data IN1 and IN2 are a graphic data and a video data, respectively. Referring to FIG. 1, the buffered data, that is, a first graphic data GDATA1 and a first video data VDATA1, are applied to the first and second data synchronizing units 110 and 115 with the first graphic and first video enabling signals GEN1 and VEN1. That is, the first graphic data GDATA1 and the first video data VDATA1 synchronized with each of the input clock signals CK_G and CK_V are synchronized with the output clock signal CK_O in the first and second data synchronizing units 110 and 115 and are output as the second graphic data GDATA2 and the second video data VDATA2, respectively, as shown in FIGS. 2 through 4.

After step 500, the second graphic data GDATA2 and the second video data VDATA2 synchronized with the output clock signal are stored in the first FIFO 120 in response to each of the input enabling signals, that is, a second graphic enabling signal GEN2 and a second video enabling signal VEN2 in step 510. More specifically, first, it is determined whether the second graphic enabling signal GEN2 for the first input data, that is, the second graphic data GDATA2, is enabled in step 512. If the second graphic enabling signal GEN2 is enabled, the second graphic data GDATA2 synchronized with the output clock signal CK_O is stored in the first FIFO 120 in step 514. On the other hand, if the second graphic enabling signal GEN2 is disabled in step 512, then, it is determined whether the second video enabling signal VEN2 is enabled in step 516. If the second video enabling signal VEN2 is enabled in the step 516, the second video data VDATA2 synchronized with the output clock signal CK_O is stored in the first FIFO 120 in step 518. Here, data write and read are performed in the first FIFO 120.

Then, it is determined whether data of the first FIFO 120 are stored in the frame buffer 130 by comparing the write address of the first FIFO 120 with the read address of the first FIFO 120 in step 520. Specifically, it is determined whether an underflow UNF occurs between the write address and the read address of the first FIFO 120 in step 522. In step 522, the underflow UNF is obtained as follows. For example, in a case where the write address of the first FIFO 120 is larger than the read address of the first FIFO 120, if the following condition is satisfied, it is regarded that the underflow UNF occurs.

$$WADD\_F1 - RADD\_F1 < TH1 \quad \text{[Equation 1]}$$

Here, WADD_F1 denotes a first FIFO write address, RADD_F1 denotes a first FIFO read address, and TH1 is a threshold value which may be arbitrarily set by a user. In a case where the difference between the first FIFO write address WADD_F1 and the first FIFO read address RADD_F1 is smaller than the threshold value TH1, that is, in a state where the first FIFO write address WADD_F1 is larger than the first FIFO read address RADD_F1, it is determined that underflow UNF occurs in the first FIFO control unit 152 and the underflow UNF is set to a high level. That is, if it is determined that underflow UNF occurs, data of the first FIFO 120 are not output to the frame buffer 130 in step 526. Specifically, the frame buffer control unit 154 receives the underflow UNF from the first FIFO control unit 152, outputs a first frame enabling signal FDEN1 to the first FIFO control unit 152, and stops outputting data from the first FIFO 120. However, if the difference between the first FIFO write address WADD_F1 and the first FIFO read address RADD_F1 is larger than the threshold value TH1, underflow UNF does not occur and is maintained at a low level. That is, if it is judged that the underflow UNF does not occur, the data of the first FIFO 120 are stored in the frame buffer 130 in step 524. Here, it is determined by the first frame data enabling signal FDEN1 output from the frame buffer control unit 154 whether it is the graphic data or the video data, which are stored in the first FIFO 120, that is stored.

Also, in a case where the first FIFO write address WADD_F1 is not larger than the first FIFO read address RADD_F1, it is determined that the underflow UNF is detected even in a case where the following condition is satisfied.

$$N1 + WADD\_F1 - RADD\_F1 < TH1 \quad \text{[Equation 2]}$$

Here, N1 denotes a first FIFO address size. In other words, in case of the graphic data, N1 denotes the address size of a graphic data region in the first FIFO 120, and in case of the video data, N1 denotes the address of a video data region in the first FIFO 120. That is, referring to Equation 2, if a value in which the first FIFO address size N1 is added to the difference of the first FIFO write address WADD_F1 and the first FIFO read address RADD_F1 is smaller than the threshold value TH1, it is determined that the underflow UNF occurs. Here, step 526 of FIG. 5 is performed. In another case, it is determined that underflow UNF does not occur, step 524 of FIG. 5 is performed. Likewise, the underflow UNF of the Equations 1 and 2 occurring in step 520 can be commonly applied to the graphic data and the video data. Data flow between the first FIFO 120 and the frame buffer 130 performed in step 520 will be described in detail with reference to FIG. 6.

Figure 6:
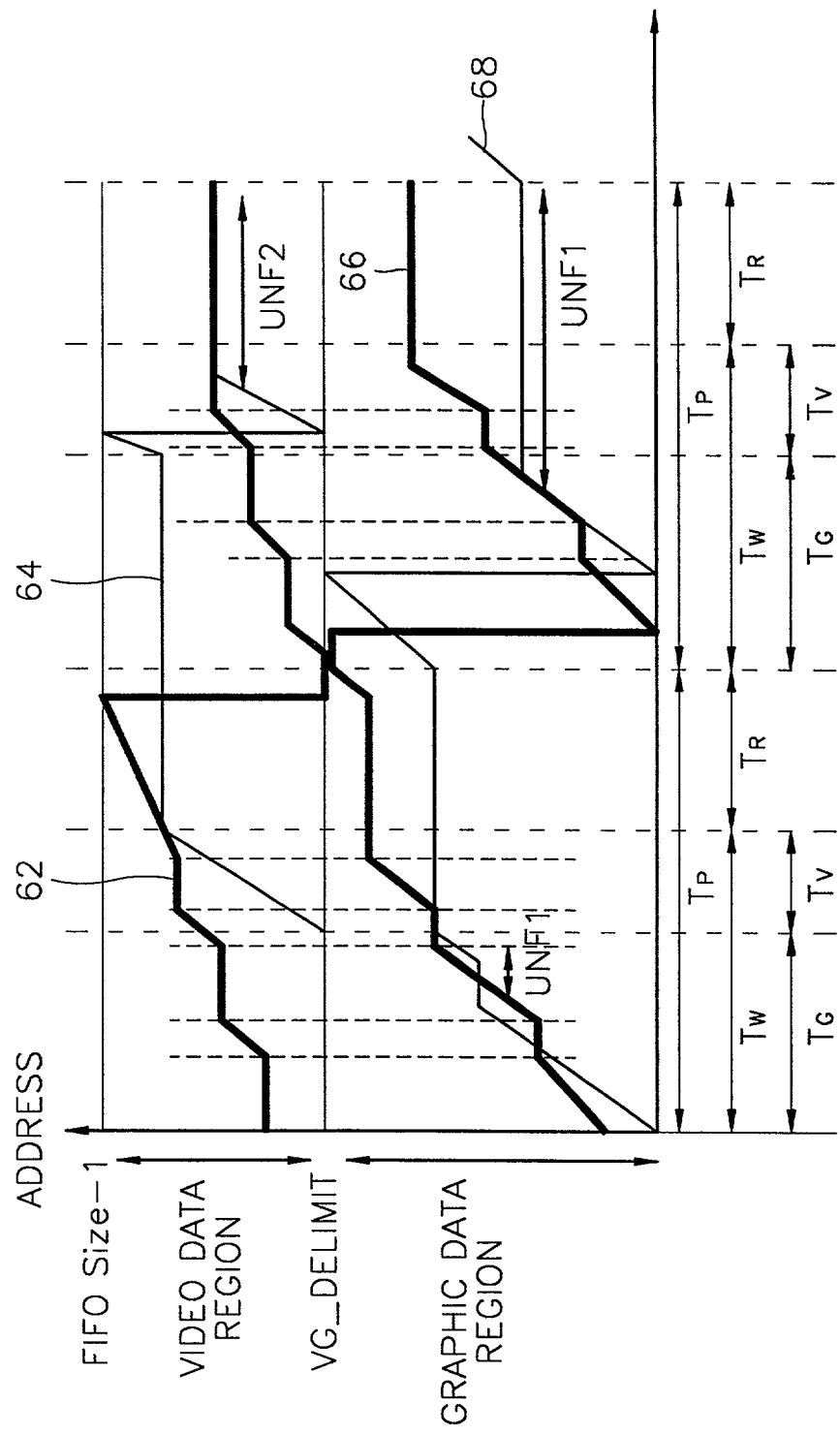
FIG. 6 illustrates input/output data flow of a first first-in first-out (FIFO) of the image processing apparatus shown in FIG. 1.

Referring to FIG. 6, VG_DELIMIT denotes a storing address delimiter for dividing an address region into the video data region and the graphic data region. As described previously, since the graphic data and the video data are exclusively input into the first FIFO 120, regions for storing the graphic data and the video data are divided. Thus, each write address for the graphic data and the video data is independently generated. Reference numeral 62 of FIG. 6 denotes video data input into the first FIFO 120, and reference numeral 64 denotes video data output from the first FIFO 120. Also, reference numeral 66 denotes graphic data input into the first FIFO 120, and reference numeral 68 denotes graphic data output from the first FIFO 120. That is, in order to perform a frame rate conversion adequate for a display device while implementing PIP, the frequency of the output clock signal CK_O must be determined so that addition of the rate of the graphic data 66 synchronized with the graphic clock signal CK_G and the rate of the video data 62 input by being synchronized with the video clock signal CK_V may be accepted.

An interval $T_P$ denotes a frame buffer data read/write interval, an interval $T_W$ denotes a data write interval where data are output from the first FIFO 120 to the frame buffer 130, and $T_R$ denotes a data read interval where data are output from the frame buffer 130 to the second FIFO 140. $T_G$ and $T_V$ denote a graphic data write interval and a video data write interval, respectively, and are exclusively used by time sharing in the first FIFO 120. The size of the first FIFO 120 is determined by the intervals of $T_W$ and $T_R$, and in the first FIFO 120, the storing address delimiter VG_DELIMIT is determined by rates of the video data input 62 and the graphic data input 66 input into the first FIFO 120.

Referring to FIG. 6, UNF1 illustrates a case where underflow is detected in the graphic data region, and UNF2 illustrates a case where the underflow is detected in the video data region. For example, when the graphic data stored in the first FIFO 120 is read from the frame buffer 130, if the rate of output data is faster than that of input data, the underflow UNF, preferably, graphic data region underflow UNF1, is output from the first FIFO control unit 152 to the frame buffer control unit 154. Thus, the frame buffer control unit 154 is notified so that the frame buffer 130 does not request additional data. As described previously, the first frame data enabling signal FDEN1 includes an interval setting signal for indicating the data write interval $T_W$ and data read interval $T_R$, and an interval setting signal for indicating the graphic data write interval $T_G$ and video data write interval $T_V$. Thus, when underflow UNF occurs, the interval setting signal for indicating the data write interval $T_w$ is disabled, and thus, additional data are not output from the first FIFO 120 to the frame buffer 130. For a case where the underflow UNF is video region underflow UNF2, the same operations are performed.

Referring back to FIG. 5A, in step 520, when data is input/output from the first FIFO 120 to the frame buffer 130, data write and read of the frame buffer 130 are controlled by the result in which the frame rate of the stored graphic data or video data is compared with that of the output display signal in step 530. Specifically, it is judged whether the frame rate of the graphic data or video data is faster than the output frame data of the output display signal in step 532. Here, if it is judged that the frame rate of the graphic data or video data is faster than that of the display signal, the frame buffer control unit 154 outputs graphic and video input blocking signals IN_BLK_G and IN_BLK_V to the first and second input buffers 100 and 105. Thus, data is not input into the first and second data synchronizing units 110 and 115 by controlling the first and second input buffers 100 and 105 and by blocking one frame of the graphic data or video data in step 534. For example, it is determined whether the graphic input blocking signal IN_BLK_G or the video input blocking signal IN_BLK_V generated from the frame buffer control unit 154 occurs according to the following condition.

$$M-F+Pi+R\_fr>F \quad \text{[Equation 3]}$$

Here, M denotes a frame buffer storage size, F is the image size of one frame, Pi is an interval of a frame of data being read as one frame data is input into the frame buffer 130, and R_fr is an output frame rate/input frame rate. Thus, if the condition of Equation 3 is satisfied, the graphic input blocking signal IN_BLK_G or the video input blocking signal IN_BLK_V is disabled and is maintained at a low level. That the graphic input blocking signal IN_BLK_G is at a low level means a normal state. That is, even though a next frame data is written in the frame buffer 130 at a rapid speed while an arbitrary frame data stored in the frame buffer 130 is being read, the next frame data is led by the read data, thereby preventing data from being damaged. However, if the condition of Equation 3 is not satisfied, the graphic input blocking signal IN_BLK_G is enabled at a high level, preventing data from being output from the first input buffer 100 of FIG. 1 to the first data synchronizing unit 110. Thus, data are not input into the frame buffer 130 through the first data synchronizing unit 110 and the first FIFO 120. Thus, damage to data caused by the frame rate of the frame buffer 130 can be prevented.

Figure 7A:
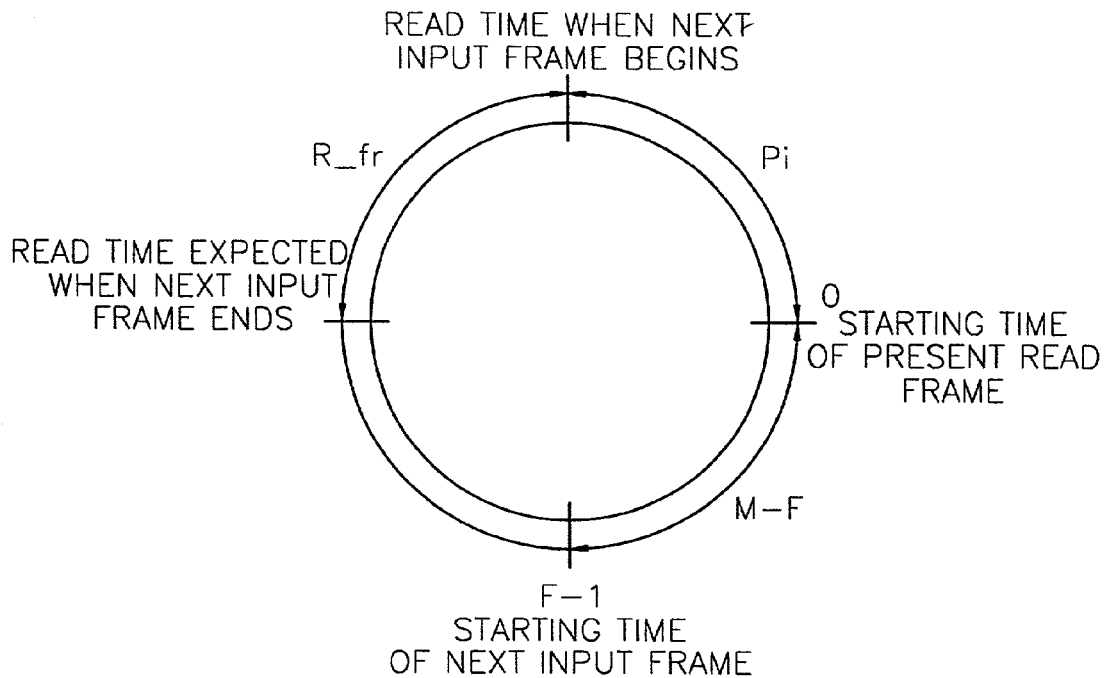
FIGS. 7A and 7B illustrate operation of a frame buffer of the image processing apparatus shown in FIG. 1.
Figure 7B:
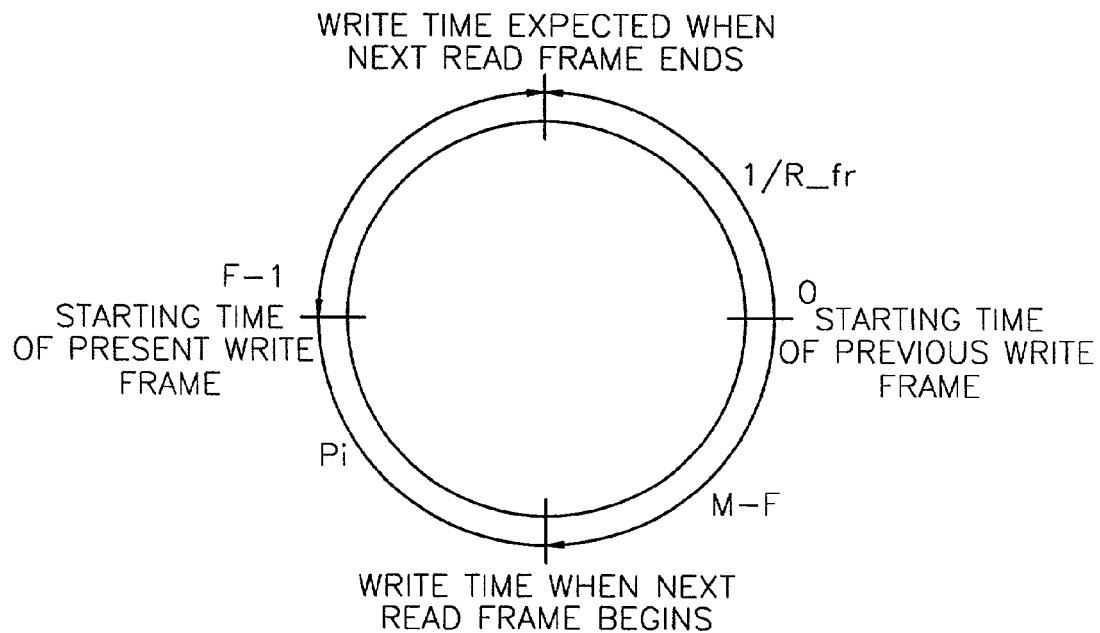

FIGS. 7A and 7B illustrate operation of a frame buffer of the apparatus shown in FIG. 1. Referring to FIG. 7A, an interval from a start time of the present read frame to a read time when the next input frame begins is indicated as Pi. Also, an interval from a start time of the next input frame to a start time of the present read frame is indicated as M–F. Additionally, an interval from a read time when the next input frame begins to a read time expected when the next input frame ends is indicated as R_fr.

Referring back to FIG. 5A, if it is judged that the frame rate of the graphic or video data is not faster than an output frame rate of the display signal in step 532, it is determined whether the frame rate of the graphic or video data is slower than the output frame rate of the display signal in step 536. If the frame rate of the graphic or video data is not slower than the output frame rate of the display signal in step 536, then step 524 is performed. However, if it is judged that the frame rate of the graphic or video data is slower than the output frame rate of the display signal, one frame of the graphic or video data stored in the frame buffer 130 is repeated and read in step 538. That is, it is determined whether the frame data is repeated and read is determined by the following conditions.

$$Pi + \frac{1}{R\_f} > F, \quad \text{and} \quad \text{[Equation 4]}$$

$$Pi>M-F$$

That is, in a case where the conditions of Equation 4 is satisfied, a signal for repeating and reading the frame data is disabled. However, in a case where the conditions of Equation 4 is not satisfied, the frame buffer 130 repeats one frame of the output data previously output by the frame buffer control signal FBCON and then outputs the output data. Here, assuming that a signal for repeating and reading the data of the frame buffer 130 is RE_read and is included in the frame buffer control signal FBCON, the signal RE_read is at a low level when the condition of Equation 4 is satisfied. Thus, data corresponding to the next address of the frame data currently output from the frame buffer 130 are consecutively output. However, if the RE_read is at a high level, the data previously output from the frame buffer 130 is reread. Reread operation of the data stored in the frame buffer 130 will be described with reference to FIG. 7B.

Referring to FIG. 7B, an interval from a start time of the previous write frame to a write time when the next read frame begins is indicated as M–F, and an interval from a start time of the previous write frame to a read time expected when the next read frame ends is indicated as 1/R_fr (that is, input frame rate/output frame rate). Also, an interval from a start time F–1 of the present write frame to a write time when the next read frame begins is indicated as Pi.

In the present invention, the frame rate for the input and/or output data can be raised or lowered by performing step 530. Thus, in the image processing apparatus and method thereof according to the present invention, a user can programmably implement a desired frame rate of the display device during frame rate conversion. Therefore, regardless of the characteristics of input data and limitations in the output display device, the input data can be stably displayed on the display device.

Referring to FIG. 5B, after step 538, data output from the frame buffer 130 are stored in the second FIFO 140. That is, it is determined whether the data are stored from the frame buffer 130 to the second FIFO 140 by comparing the write address with the read address of the second FIFO 140, and stored data are output as a display signal in step 540. Specifically, it is judged whether the overflow OVF occurs between the write address and the read address of the second FIFO 140 in step 542. Here, overflow OVF indicates that the data input into the second FIFO 140 are lead by output data, and it can be determined whether overflow OVF occurs by the address of the second FIFO 140. Here, occurrence of overflow OVF is determined according to the satisfaction of the following condition in a case where the write address of the second FIFO 140 is larger than the read address of the second FIFO 140.

$$N2+RADD\_F2-WADD\_F2<TH2 \quad \text{[Equation 5]}$$

Here, N2 is a second FIFO address size, WADD_F2 is a second FIFO write address, RADD_F2 is a second FIFO 140 read address, and TH2 is a threshold value which is set by a user. Thus, if a value of the second FIFO write address WADD_F2 subtracted from the sum of the second FIFO read address RADD_F2 and the address size N2 of the second FIFO 140 is smaller than the threshold value TH2, it is determined that overflow OVF occurs, and here, the overflow OVF is at a high level. However, if the conditions of Equation 5 is not satisfied, it is determined that the overflow OVF does not occur, and the OVF is at a low level. Also, in a case where the second FIFO write address WADD_F2 is not larger than the second FIFO read address RADD_F2, if the following condition is satisfied, it is determined that overflow OVF occurs.

$$RADD\_F2 - WADD\_F2 < TH2 \qquad \text{[Equation 6]}$$

That is, in a case where the difference between the second FIFO read address RADD_F2 and the second FIFO write address WADD_F2 is smaller than the threshold value TH2, it is determined that overflow OVF occurs. However, if the condition of Equation 6 is not satisfied, overflow OVF does not occur and is maintained at a low level. When referring to Equations 5 and 6, if it is determined that overflow OVF occurs in step 542, data stored in the frame buffer 130 are not output to the second FIFO 140 in step 548. However, if it is judged that overflow OVF does not occur in step 542, data of the frame buffer 130 are stored in the second FIFO 140 in step 544. Also, the data stored in the second FIFO 140 are output as a display signal in accordance with an output display format in step 546.

Figure 8:
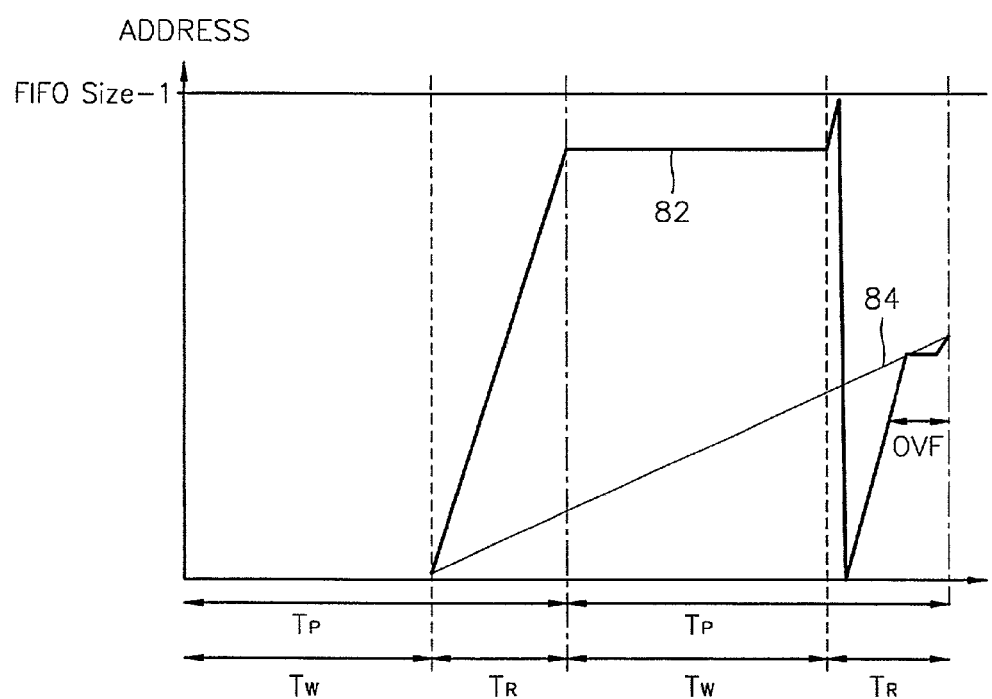
FIG. 8 illustrates input/output data flow of a second FIFO of the image processing apparatus shown in FIG. 1.

FIG. 8 illustrates data input/output flow of the second FIFO 140 of the image processing apparatus shown in FIG. 1. Referring to FIG. 8, reference numeral 82 denotes data input into the second FIFO 140, and reference numeral 84 denotes data output of the second FIFO 140. That is, data read into the second FIFO 140 is performed only at a data read interval $T_R$ of the frame buffer 130, and data is not input to the second FIFO 140 at other intervals. The frame buffer control unit 154 enables the second frame data enabling signal FDEN2 at the data read interval $T_R$ where the data is read from the frame buffer 130 to the second FIFO 140 so that the data may be input to the second FIFO 140. However, the second frame data enabling signal FDEN2 applied from the frame buffer control unit 154 to the second FIFO control unit 156 is disabled at an interval where overflow OVF occurs between the two data read intervals $T_R$, and thus, data is not input from the frame buffer 130 to the second FIFO 140.

Frame rate conversion for the display device while implementing PIP can be performed according to the above-mentioned steps.

According to the present invention, memories such as first and second FIFOs 120 and 140 and the frame buffer 130 can be effectively operated, and efficiency in the system size can be increased by using only one frame buffer when implementing PIP. Also, frame rate conversion is performed by using a simple data synchronizing circuit without using the PLL, thereby preventing damage to data and performing frame rate conversion using a minimum amount of memory. Also, the image processing apparatus according to the present invention can programmably implement a desired frame rate of the display device during frame rate conversion, thereby supporting various input formats.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An image processing apparatus for displaying a plurality of input data asynchronously input through different channels on one display device and converting frame rates of the input data in accordance with an output frame rate of the display device, the apparatus comprising:

an input buffer unit for buffering input data which are externally and asynchronously input through at least two channels by different input clock signals and outputting buffered data as first data and first data enabling signals;

a data synchronizing unit for synchronizing the first data output from the input buffer unit with an output clock signal in response to the input clock signals and the first data enabling signals and outputting synchronized data as second data and second data enabling signals in response to each of the first data enabling signals;

a first memory for multiplexing the second data according to time sharing, storing the second data in different regions, and outputting the stored second data in response to a first memory enabling signal;

a second memory for writing and reading data output from the first memory in response to a frame buffer control signal;

a third memory for storing data output from the second memory and comprising a single output terminal for outputting the stored data as a display signal in response to a second memory enabling signal; and a memory control unit for (i) detecting underflow conditions in the first memory and detecting overflow conditions in the third memory, (ii) generating the first memory enabling signal that is applied to the first memory to control data flow between the first memory and the second memory, (iii) generating the frame buffer control signal that is applied to the second memory to control frame rates of the input data and to control frame rates of the display signal in response to the underflow and overflow conditions, and (iv) generating the second memory enabling signal that is applied to the third memory to control data flow between the second memory and the third memory.

2. The apparatus of claim 1, wherein the data synchronizing unit includes a plurality of data synchronizing units for synchronizing the first data with the output clock signal, and the plurality of data synchronizing units comprises:

a write address counter for counting a write address of the first memory in response to the first data enabling signals and the input clock signals and outputting the counted write address;

a demultiplexer for demultiplexing the first data in response to the counted write address and selectively outputting the demultiplexed data;

a parallel buffer including a plurality of parallel registers for storing the demultiplexed first data;

a frequency conversion module for converting the frequency of the counted write address into the frequency region of the output clock signal and outputting a converted frequency write address;

a read address counter for counting a read address of the first memory in response to the second data enabling signals and the output clock signal and outputting the counted read address;

an underflow detecting unit for detecting underflow of the first memory from the converted frequency write address and the counted read address and outputting a detected result;

a graphic enabling signal generating unit for generating the second data enabling signals in response to the underflow; and a multiplexer for selectively outputting data stored in the parallel buffer as the second data in response to the counted read address.

3. The apparatus of claim 1, wherein the input buffer unit comprises:

a first input buffer for buffering a graphic data input through a first channel in response to a graphic clock signal and outputting buffered data as a first graphic data and a first graphic enabling signal; and a second input buffer for buffering a video data input through a second channel in response to a video clock signal and outputting buffered data as a first video data and a first video enabling signal.

4. The apparatus of claim 3, wherein the data synchronizing unit comprises:

a first data synchronizing unit for inputting the first graphic data in response to the graphic clock signal and synchronizing the first graph data with the output clock signal to generate a second graphic data and a second graphic enabling signal; and a second data synchronizing unit for inputting the first video data in response to the video clock signal and synchronizing the first video data with the output clock signal to generate a second video data and a second video enabling signal.

5. The apparatus of claim 4, wherein the first memory is divided into different storing regions and is realized by a first first-in first-out (FIFO) for selectively storing the second graphic data and the second video data, which are output from the first and second data synchronizing units, in response to the first memory enabling signal.

6. The apparatus of claim 5, wherein the second memory is realized by a frame buffer for storing at least one frame of data stored in the first FIFO.

7. The apparatus of claim 6, wherein the third memory is realized by a second FIFO for outputting data output from the second memory as the display signal in response to the second memory enabling signal.

8. The apparatus of claim 7, wherein the memory control unit comprises:

a first FIFO control unit for generating the first memory enabling signal in response to the second graphic enabling signal, a delayed video enabling signal, and a first frame data enabling signal, detecting underflow between a write address and a read address of the first FIFO, and controlling data write and read of the first FIFO according to a detected result;

a second FIFO control unit for generating the second memory enabling signal in response to a second frame data enabling signal and an output enabling signal, detecting overflow between a write address and a read address of the second FIFO, and controlling data write and read of the second FIFO according to a detected result; and a frame buffer control unit for comparing a frame rate of data input to the frame buffer with that of an output display signal, generating an input blocking signal for blocking data of the first and second input buffers in response to a compared result to apply the input blocking signal to the first and second input buffers, and generating the first and second frame data enabling signals and the frame buffer control signal in response to the underflow and the overflow.

9. The apparatus of claim 4, wherein the image processing apparatus further comprises a color space converting unit for converting the second video data output from the second data synchronizing unit into a converted video data, outputting the converted video data to a video region of the first memory, and delaying the second video enabling signal for a predetermined time to output the delayed second video enabling signal to the memory control unit and the first data synchronizing unit.

10. An image processing method for displaying a plurality of input data asynchronously input through different channels on one display device and converting frame rates of the input data in accordance with an output frame rate of the display device, the method comprising the steps of:

(a) buffering the plurality of input data by using each of input clock signals and synchronizing each of buffered data with an output clock signal;

(b) storing the plurality of input data synchronized with the output clock signal in a first memory in response to each of input enabling signals;

(c) comparing a write address of the first memory with a read address of the first memory to determine whether data stored in the first memory are stored in a second memory and to detect underflow conditions in the first memory;

(d) comparing frame rates of each of the plurality of input data with that of an output display signal to control data write and read of the second memory; and (e) comparing a write address of a third memory with a read address of the third memory to determine whether output data of the second memory are stored in the second memory and to detect overflow conditions in the third memory, and outputting data stored in the third memory through a single output terminal of the third memory as a display signal for displaying on the display device.

11. The method of claim 10, wherein the step (b) comprises the steps of:

(b1) determining whether an enabling signal for a first input data among the plurality of input data is enabled;

(b2) storing the first input data synchronized with the output clock signal in the first memory if the enabling signal for the first input data is enabled;

(b3) determining whether an enabling signal for a second input data is enabled if the enabling signal for the first input data is disabled in step (b1); and (b4) storing the second input data synchronized with the output clock signal in the first memory if the enabling signal for second input data is enabled.

12. The method of claim 10, wherein first and second input data are multiplexed according to time sharing and stored in different regions of the first memory in the step (b).

13. The method of claim 10, wherein the step (c) comprises the steps of:

(c1) determining whether underflow occurs between the write address of the first memory and the read address of the first memory;

(c2) stopping data output from the first memory to the second memory if it is determined that underflow occurs between the write address of the first memory and the read address of the first memory; and (c3) storing one of a first input data and a second input data, which is stored in the first memory, in the second memory if underflow does not occur between the write address of the first memory and the read address of the first memory.

14. The method of claim 13, wherein the step (c1) comprises the steps of:
- (c11) determining whether the write address of the first memory is larger than the read address of the first memory;
- (c12) determining that underflow occurs in a case where the following condition:

$WADD\_F1 - RADD\_F1 < TH1$ is satisfied, if it is determined that the write address of the first memory is larger than the read address of the first memory; and
- (c13) determining that underflow occurs in a case where the following condition:

$N1 + WADD\_F1 - RADD\_F1 < TH1$ is satisfied, if it is determined that the write address of the first memory is not larger than the read address of the first memory in the step (c11);

wherein WADD_F1 is the write address of the first memory, RADD_F1 is the read address of the first memory, TH1 is a predetermined threshold value, and N1 is the size of an address for one of the first input data and the second input data of the first memory.

15. The method of claim 10, wherein the step (d) comprises the steps of:
- (d1) determining whether a frame rate of one of first and second input data is larger than that of the output display signal;
- (d2) intercepting input by blocking one frame of one of the first and second input data if it is determined that the frame rate of the input data is larger than that of the output display signal;
- (d3) determining whether the frame rate of the input data is smaller than that of the output display signal if it is determined that the frame rate of the input data is not larger than that of the output display signal in the step (d1); and
- (d4) reading and repeating one frame of one of the first and second input data, which is stored in the second memory, if it is determined that the frame rate of the input data is smaller than that of the output display signal.

16. The method of claim 15, wherein the first or second input data are blocked in a case where the following condition:

$M - F + Pi + R\_fr > F$ is not satisfied in the step (d2), wherein M is a storage size of the second memory, F is an image size of one frame, Pi is the position of frame data being read when one frame data begin to be input in the second memory, and R_fr is an output frame rate/input frame rate.

17. The method of claim 15, wherein one frame of data stored in the second memory is repeated and read in a case where the following conditions:

$Pi + \dfrac{1}{R\_fr} > F$, and $Pi > M - F$ are not satisfied in the step (d4), wherein M is a storage size of the second memory, F is an image size of one frame, Pi is the position of frame data being read when one frame data being to be input in the second memory, and R_fr is an output frame rate/input frame rate.

18. The method of claim 10, wherein the step (e) comprises the steps of:
- (e1) determining whether overflow occurs between the write address of the third memory and the read address of the third memory;
- (e2) stopping data output from the third memory if it is determined that overflow occurs between the write address of the third memory and the read address of the third memory;
- (e3) storing data of the second memory in the third memory if it is determined that overflow does not occur between the write address of the third memory and the read address of the third memory; and
- (e4) outputting data stored in the third memory as the display signal in accordance with an output display format.

19. The method of claim 18, wherein the step (e1) comprises the steps of:
- (e11) determining whether the write address of the third memory is larger than the read address of the third memory;
- (e12) determining that the overflow occurs in a case where the following condition:

$N2 + RADD\_F2 - WADD\_F2 < TH2$ is satisfied, if it is determined that the write address of the third memory is larger than the read address of the third memory; and
- (e13) determining that the overflow occurs in a case where the following condition:

$RADD\_F2 - WADD\_F2 < TH2$ is satisfied, if it is determined that the write address of the third memory is not larger than the read address of the third memory in step (c11), wherein WADD_F2 is the write address of the second memory, RADD_F2 is the read address of the second memory, TH2 is a threshold value, and N2 is the size of an address of the third memory.

20. The method of claim 10, wherein first and second input data are a graphic data for indicating R/G/B and a video data for indicating a luminance signal (Y) and a color-difference signal (U/V), respectively.

* * * * *